US009442677B2

(12) United States Patent
Hoarau et al.

(10) Patent No.: US 9,442,677 B2
(45) Date of Patent: Sep. 13, 2016

(54) ACCESS OF A DIGITAL VERSION OF A FILE BASED ON A PRINTED VERSION OF THE FILE

(75) Inventors: Eric Hoarau, San Francisco, CA (US); Jessica Liao, Brookline, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1469 days.

(21) Appl. No.: 12/891,395

(22) Filed: Sep. 27, 2010

(65) Prior Publication Data

US 2012/0075491 A1  Mar. 29, 2012

(51) Int. Cl.
  *G06F 3/12* (2006.01)
  *G06F 17/30* (2006.01)
  *H04N 1/00* (2006.01)
  *H04N 1/44* (2006.01)

(52) U.S. Cl.
  CPC ........... *G06F 3/1204* (2013.01); *G06F 3/1267* (2013.01); *G06F 3/1268* (2013.01); *G06F 3/1285* (2013.01); *G06F 3/1292* (2013.01); *G06F 17/30197* (2013.01); *G06F 17/30876* (2013.01); *H04N 1/00143* (2013.01); *H04N 1/00148* (2013.01); *H04N 1/00188* (2013.01); *H04N 1/00244* (2013.01); *H04N 1/00278* (2013.01); *H04N 1/00307* (2013.01); *H04N 1/444* (2013.01); *H04N 1/4413* (2013.01); *G06F 3/1222* (2013.01); *G06F 3/1238* (2013.01); *H04N 2201/325* (2013.01); *H04N 2201/3249* (2013.01); *H04N 2201/3278* (2013.01)

(58) Field of Classification Search
  CPC .......................... G06F 3/1204; G06F 3/1238
  USPC ..................................... 235/462.1
  See application file for complete search history.

(56) References Cited

U.S. PATENT DOCUMENTS

| 6,950,800 | B1* | 9/2005 | McIntyre et al. ............ 705/1.1 |
| 7,519,236 | B2 | 4/2009 | Cheng et al. |
| 2004/0202385 | A1* | 10/2004 | Cheng et al. ................ 382/305 |
| 2006/0158463 | A1* | 7/2006 | Michlin ....................... 345/634 |
| 2007/0047842 | A1 | 3/2007 | Bhaskaran et al. |
| 2007/0181691 | A1 | 8/2007 | Chang |
| 2009/0076964 | A1* | 3/2009 | Jackson et al. ................ 705/52 |
| 2009/0171915 | A1* | 7/2009 | Rothschild ...................... 707/3 |
| 2009/0177748 | A1* | 7/2009 | Serlet ........................... 709/206 |
| 2010/0213251 | A1* | 8/2010 | Hvidtfeldt .................... 235/375 |

FOREIGN PATENT DOCUMENTS

WO  2008/134901  11/2008

OTHER PUBLICATIONS

"How Do I Connect a Wireless Picture Frame to Photo Album?" http://www.google.com/support/forum/p/Picasa/thread?tid=580d0efa50b28a72&hl=en.
"Real-Time Document Image Retrieval with LLAH." http://www.m.cs.osakafu-u.ac.jp/LLAH/.
"Video Booklet." Hua et al. IEEE. 2005.

* cited by examiner

*Primary Examiner* — Thien T Mai
*Assistant Examiner* — Toan Ly
(74) *Attorney, Agent, or Firm* — HP Inc Patent Department

(57) ABSTRACT

Example embodiments relate to access of a digital version of a file. In example embodiments, a location identifier printed in association with a printed version of a file is received. A digital storage location on a server computing device corresponding to the location identifier may then be accessed. A digital version of the file corresponding to the printed version of the file may then be accessed from the digital storage location.

20 Claims, 5 Drawing Sheets

ACCESS OF A DIGITAL VERSION OF A FILE BASED ON A PRINTED VERSION OF THE FILE

BACKGROUND

With the rapid growth of computing technologies and the wide availability of computing devices of various form factors, many users have replaced paper-based documents, images, and other files with corresponding digital versions. For example, in business and academic settings, word processing files are generally used in lieu of handwritten and typed documents. Similarly, many users now use digital cameras to generate digital photographs without initially obtaining a print of the photographs.

Despite the prevalence of digital files, printed versions of these files have maintained their relevance. For example, a user may find it more convenient to read a printed document or to distribute multiple printed copies to other individuals. As another example, a computer user may desire to print a photo album containing multiple photos in order to share the photos with family and friends.

BRIEF DESCRIPTION OF THE DRAWINGS

The following detailed description references the drawings, wherein.

DETAILED DESCRIPTION

As detailed above, digital files have replaced printed versions in many settings, but hard copies of documents, images, and other files have maintained their relevance. Unfortunately, when a user prints a copy of a digital file, there is generally no link between the digital version and the printed version. In other words, if a recipient of a printed version wishes to obtain the digital version, he or she is unable to do so without asking the owner of the file to access his or her computer at a later time, search for the file, and send the digital version. This can be problematic when, for example, a viewer of a printed photo desires to quickly obtain a high-resolution digital version of the photo or when a reader of a printed document desires to obtain an editable version of the document.

To address these issues, example embodiments disclosed herein provide a link between a printed and digital version of a file, such that the recipient of a printed version can easily access the digital version. For example, in some embodiments, a printed version of a file includes a location identifier that identifies a digital storage location at which the digital file is stored. A computing device may then receive the location identifier, provide the location identifier to a server computing device with access to the corresponding digital storage location, and access the digital version of the file from the digital storage location.

In this manner, a recipient of a printed version of a file may enjoy the benefits of a hard copy, such as readability and mobility, while maintaining the ability to obtain a digital version if he or she desires. Additional embodiments and advantages and applications of such embodiments will be apparent to those of skill in the art upon reading and understanding the following description.

Figure 1:
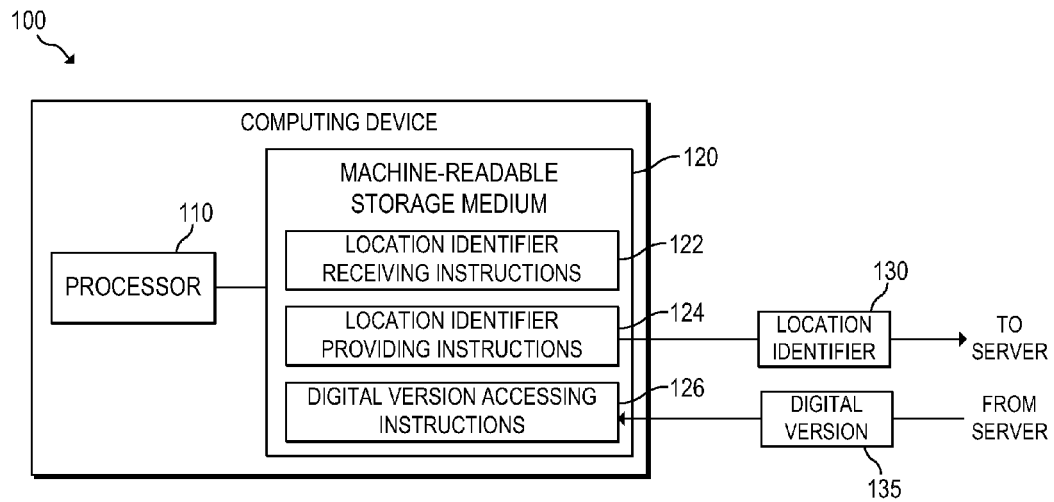
FIG. 1 is a block diagram of an example computing device for accessing a digital version of a file based on a location identifier printed in association with a printed version of the file.

Referring now to the drawings, FIG. 1 is a block diagram of an example computing device 100 for accessing a digital version of a file 135 based on a location identifier 130 printed in association with a printed version of the file. Computing device 100 may be, for example, a notebook computer, a desktop computer, an all-in-one system, a slate computing device, a portable reading device, a wireless email device, a mobile phone, or any other computing device. In the embodiment of FIG. 1, computing device 100 includes processor 110 and machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 122, 124, 126 to implement digital version accessing procedure described in detail below. As an alternative or in addition to retrieving and executing instructions, processor 110 may include one or more integrated circuits (ICs) or other electronic circuits that include a number of electronic components for performing the functionality of one or more of instructions 122, 124, 126.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read-Only Memory (CD-ROM), and the like.

As described in detail below, machine-readable storage medium 120 may be encoded with a series of executable instructions 122, 124, 126 for accessing a digital version 135 corresponding to a printed version of a file. These instructions may be included in, for example, an application running on computing device 100 that provides access to a digital storage space accessible to a server computing device. The server computing device may be, for example, a server of an online file hosting service or a file server executing on a personal computing device of an owner of the digital file 135.

Machine-readable storage medium 120 may include location identifier receiving instructions 122, which may receive a location identifier 130 that identifies a digital storage location. The location identifier 130 may be, for example, a barcode, an image encoded with information, a sequence of characters, or any other information suitable for identifying a particular digital storage location. Location identifier 130 may be printed in association with a printed version of a file, which may be any paper copy of a digital file, such as a printout of a word processing document, Portable Document Format (PDF) file, email message, digital photo, or other type of file. As an example, if the printed version is a paper copy of a word processing document, location identifier 130 may be printed in a margin of each page or at the end of the document. Similarly, if the printed version is a photo album, location identifier 130 may be printed on the inside or outside of either cover or in the margin of one or more pages. Other suitable placements of location identifier 130 will be apparent to those of skill in the art based on the type of file.

Because location identifier 130 is printed in association with a printed version of the file, a recipient of the printed version may use location identifier 130 to obtain a digital version 135 of the file from the digital storage location referenced by location identifier 130. Receiving instructions 122 may receive input of location identifier 130 in a variety of manners. In some embodiments, receiving instructions 122 may include instructions for capturing an image of location identifier 130 using a camera of the computing device and extracting location identifier 130 based on analysis of the captured image. Additional details regarding the capture and analysis of an image of location identifier 130 are provided below in connection with image capture module 228 of FIG. 2. In addition or as an alternative, receiving instructions 122 may receive user entry of location identifier 130 using an input device of computing device 100, such as a keyboard, mouse, or touch screen. For example, when location identifier 130 is a sequence of characters, such as a number or alphanumeric code, the user may use the input device to manually enter the code into computing device 100.

Machine-readable storage medium 120 may also include location identifier providing instructions 124, which may provide the received location identifier 130 to a server computing device with access to the digital storage location. The server computing device may be any system with the capability of receiving a request for a file and transmitting the file to computing device 100. Thus, the server computing device may be, for example, a dedicated server or a personal computer with file sharing capabilities. The digital storage location accessible to the server may be, for example, a drive, a partition, a folder, a path name of a file, or any location in which one or more files are stored.

Upon receipt of location identifier 130, providing instructions 124 may first identify a server to which location identifier 130 is to be transmitted. In some embodiments, location identifier 130 may include information sufficient to identify the appropriate server, such as an Internet Protocol (IP) address, a Uniform Resource Locator (URL), or similar information. Alternatively, providing instructions 124 may be configured to transmit the received location identifier 130 to a predetermined location, such that the same server is accessed each time a location identifier 130 is received. As another example, providing instructions 124 may receive user entry of a location of a server to which providing instructions 124 are to transmit location identifier 130.

After determining the appropriate server, providing instructions 124 may transmit location identifier 130 to the identified server computing device. In embodiments in which an image of location identifier 130 is captured, providing instructions 124 may transmit the captured image to the server for processing by the server or, alternatively, may first extract location identifier 130 and then transmit location identifier 130 to the server.

The mechanism for controlling access to the digital storage location by the owner of the file (i.e., a person or entity who has access to the digital version 135) may vary by embodiment. For example, in some embodiments, the digital storage location may be a drive, partition, folder, or path in a storage device accessible to the server computing device, which may be a personal computing device of the owner of the file. In such embodiments, access to this storage location may be controlled by the owner of the file using a password or other authentication parameter, such that providing instructions 124 also receive entry of the authentication parameter and forward it to the server computing device.

As an alternative, the digital storage location may be a storage location provided for an account of the owner of the file by an online file hosting service implemented by the server computing device. In such embodiments, the file hosting service may provide the owner of the file with an allocated portion of storage space. The owner of the file may then instruct the server to manage access to the storage space by, for example, using his or her account to assign a shared access password or other authentication parameter.

Machine-readable storage medium 120 may also include digital version accessing instructions 126, which may access a digital version 135 of the file corresponding to the printed version of the file from the digital storage location. In embodiments in which location identifier 130 uniquely identifies a particular digital file, accessing instructions 126 may automatically receive the digital version 135 from the server computing device.

Alternatively, in some embodiments, accessing instructions 126 may first receive a listing of files available on the digital storage location from the server computing device. Accessing instructions 126 may then output the file listing, which may identify individual files, folders, and/or drives, such that the user may browse the listing and select a particular digital version 135 to be obtained from the server.

After receiving the digital version 135, accessing instructions 126 may perform one or more actions specified by the user. For example, accessing instructions 126 may include instructions for saving the digital version of the file 135 to a local storage device of computing device 100, such as a local hard drive, flash memory drive, or similar storage device. In addition, accessing instructions 126 may include instructions for sending the digital version of the file 135 to a printer accessible to computing device 100.

In embodiments in which the server computing device implements an online file hosting service, accessing instructions 126 may include instructions for saving the digital version of the file 135 to an account of the user maintained by the file hosting service. For example, the user of computing device 100 may identify his or her account with the file hosting service and instruct the server to save the file in the digital storage provided for that account. In addition or as an alternative, accessing instructions 126 may include instructions for ordering an additional printed version of the digital file 135 from the online file hosting service.

Figure 2:
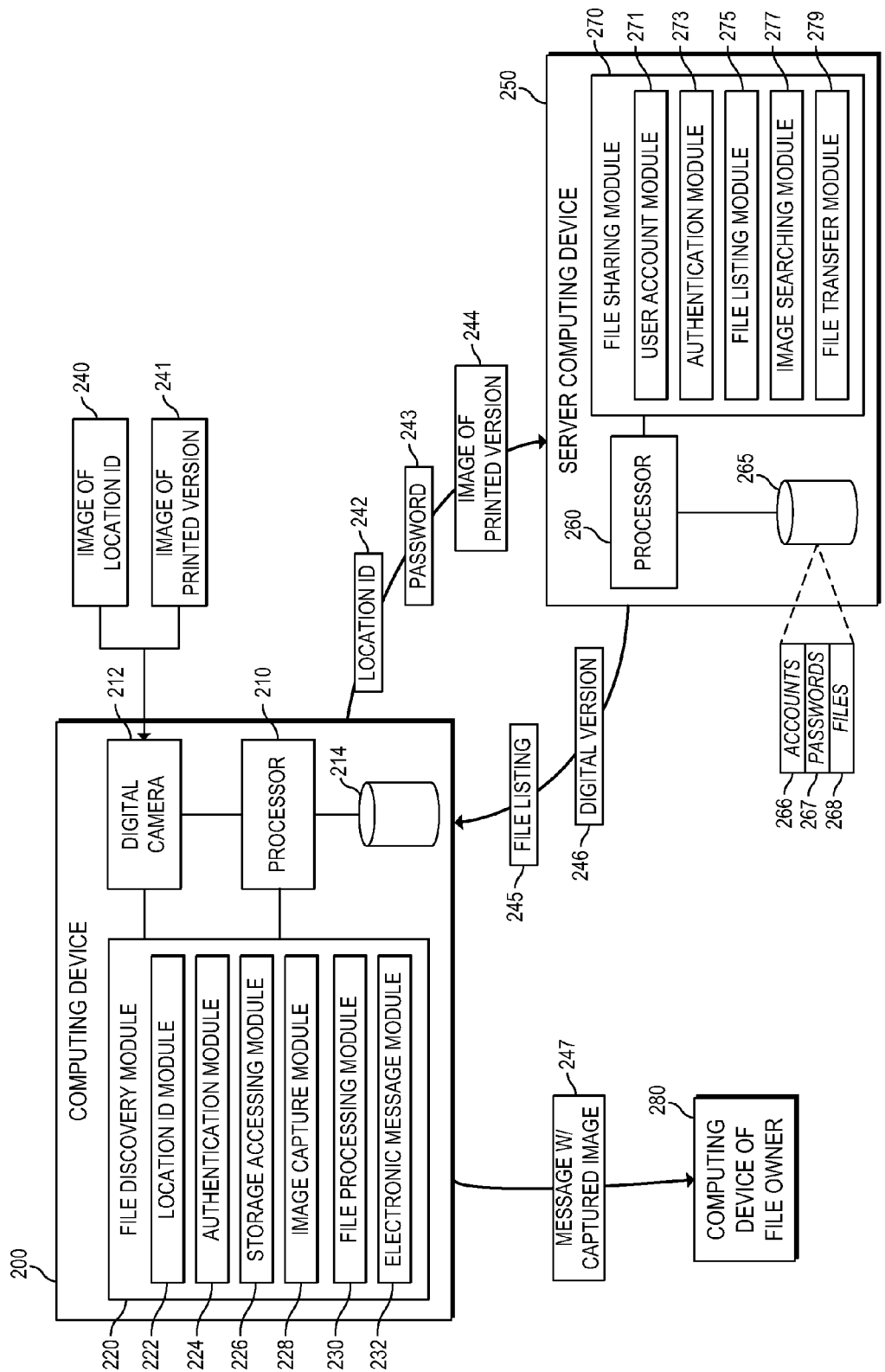
FIG. 2 is a block diagram of an example computing device in communication with a server computing device for accessing a digital version of a file based on a captured image of a location identifier obtained using a digital camera.

FIG. 2 is a block diagram of an example computing device 200 in communication with a server computing device 250 for accessing a digital version of a file 246 based on a captured image 240 of a location identifier 242 obtained using a digital camera 212. As detailed below, computing device 200 may receive a location identifier 242, provide the location identifier 242 to server computing device 250, and receive a digital version 246 of a particular file.

As with computing device 100 of FIG. 1, computing device 200 may be a notebook computer, a desktop computer, an all-in-one system, a slate computing device, a portable reading device, a wireless email device, a mobile phone, or any other computing device. As with processor 110, processor 210 may be a CPU or microprocessor suitable for retrieval and execution of instructions and/or one or more electronic circuits configured to perform the functionality of one or more of the modules 220-232 described below.

Digital camera 212 may be any camera capable of capturing digital images that is coupled to or otherwise in communication with computing device 200. Thus, digital camera 212 may be, for example, an integrated camera or webcam, a camera attached to computing device 200 with a Universal Serial Bus (USB) or other cable, and the like. As detailed below, image capture module 228 may utilize digital camera 212 to obtain an image of location identifier 240 and/or to obtain an image of the printed version of the file 241.

Local storage device 214 may comprise a number of physical media for storing data under the direction of processor 210. For example, storage device 214 may include one or more hard disks, solid state drives, tape drives, nanodrives, holographic storage devices, or any combination of such storage devices. As detailed below, upon receipt of a digital version 246 corresponding to a printed version of a file, file processing module 230 may store the digital version 246 in local storage device 214.

Computing device 200 may also include a series of modules 220-232 for obtaining a digital version 246 of a particular file. Each of the modules may include, for example, one or more hardware devices including electronic circuitry for implementing the functionality described below. In addition or as an alternative, each module may be implemented as a series of instructions encoded on a machine-readable storage medium of computing device 200 and executable by processor 210.

File discovery module 220 may include a series of modules 222-232 for enabling a user of computing device 200 to obtain a digital version 246 corresponding to a printed version of a file. Thus, file discovery module 220 may include location ID module 222, authentication module 224, storage accessing module 226, image capture module 228, file processing module 230, and electronic message module 232, each of which is described in turn below.

Location identifier module 222 may receive a location identifier 242 printed in association with a printed version of a file. The location identifier 242 may correspond to a digital storage location 265 for which access rights are controlled by an owner of the file. For example, as detailed below, an owner of the digital file may control access to digital storage location 265 by setting a shared access password or other authentication parameter.

As with location identifier 130 of FIG. 1, location identifier 242 may be, for example, a barcode, an image encoded with information, or a sequence of characters. Location identifier 242 may be printed in association with a printed version of the file, which may be any paper copy of digital version 246. As with receiving instructions 122 of FIG. 1, location ID module 222 may receive input of location identifier 242 from a user using an input device of computing device 200 or based on capture and analysis of an image 240 of location identifier 242 using image capture module 228, described in detail below.

Upon receipt of the location identifier 242, location ID module 222 may provide the location identifier 242 to a server computing device 250 with access to the digital storage location 265. In embodiments in which image capture module 228 obtains an image 240 of the location identifier 242, location ID module 222 may transmit the captured image to server computing device 250 or, alternatively, may extract location identifier 242 from the image 240 prior to transmitting the location identifier 242 to server computing device 250.

Authentication module 224 may provide authentication information to server computing device 250 to authenticate the user's access rights to digital storage location 265. For example, subsequent to transmission of location identifier 242 to server computing device 250, authentication module 224 may receive a request for an authentication parameter from authentication module 273 of server computing device 250. This authentication parameter may be printed in association with the printed version of the file. For example, the authentication parameter may be printed separately in a margin of the printed version or may be instead be a component of the printed version, such as the title. In response to receipt of a request from server computing device 250, authentication module 224 may request user entry of the authentication parameter using an input device of computing device 200, such as a keyboard, touch screen, mouse, or a biometric device. Upon user entry of the parameter, authentication module 224 may then forward the password 243 or other authentication parameter to server computing device 250 for processing.

Upon proper authentication, storage accessing module 226 may access the digital version 246 of the file corresponding to the printed version of the file from digital storage location 265. For example, upon provision of location ID 242 to server computing device 250, storage accessing module 226 may receive a file listing 245 that specifies a number of files and/or folders included in the digital storage location 265 corresponding to location identifier 242. In response, storage accessing module 226 may display the listing of files available in the digital storage location 265 and receive a user selection of a file to access. Upon receipt of the user selection, storage accessing module 226 may then retrieve a digital version 246 of the selected file from the digital storage location 265 and, as described below, file processing module 230 may then perform any user-requested actions using the digital version 246.

Image capture module 228 may utilize digital camera 212 to capture an image 240 of the location identifier and, in response, may extract the location identifier 242 from the captured image. As an example, when the location identifier is a sequence of characters, image capture module 228 may obtain an image of the characters and perform an optical character recognition (OCR) process to extract text corresponding to the location identifier 242 from the captured image. As another example, when the location identifier is a barcode or other image encoded with information, image capture module 228 may first rotate the image to a predetermined orientation and resize the image to a predetermined size. Image capture module 228 may then utilize an edge detection procedure to locate the position of the barcode or encoded image within the captured image. Finally, image capture module may analyze features of the isolated image to extract the textual location identifier.

In some embodiments, image capture module 228 may perform the image processing procedure using any of a number of commercially-available software development kits, such as the VintaSoftBarcode.NET library published by Vinta Software, the Barcode Reader SDK provided by Softek Software, or the ByteScout BarCode Reader SDK.

Additional software development kits and techniques for extracting the location identifier from image 240 will be apparent to those of skill in the art.

Image capture module 228 may also utilize digital camera 212 to capture an image 241 of the printed version of the file. For example, in some embodiments, when the digital storage location 265 identified by location identifier 242 cannot be located, cannot be accessed, or is otherwise unavailable, image capture module 228 may capture an image 241 of the printed version. The image 241 of the printed version may be, for example, a captured picture of one or more photos or pages of the printed document. Image capture module 228 may then transmit the image 244 of the printed version for execution of a search of digital storage location 265 by image searching module 277. In addition, in some embodiments, rather than receiving and transmitting location identifier 242 to server computing device 250, computing device 200 may instead capture an image 241 of the printed version of the file for transmission to the owner of the file. As detailed below, electronic message module 232 may then compose and transmit an electronic message to the owner including the captured image 241 and a request for the digital version 246.

File processing module 230 may perform a user-specified action upon receipt of a digital version 246 corresponding to a printed version of the file. For example, file processing module 230 may save the digital version 246 in a user-specified or predetermined location in local storage device 214. In addition or as an alternative, file processing module 230 may send digital version 246 to a printer accessible to computing device 200. When server computing device 250 implements an online file hosting service, file processing module 230 may instruct the server 250 to save the digital version 246 in a digital storage location 265 provided for an account of the user of computing device 200. In addition, file processing module 230 may order an additional printed version of digital version 246 from the file hosting service.

Electronic message module 232 may transmit an electronic message to a computing device 280 of the owner of the file requesting the digital version 246 corresponding to an image of the printed version obtained by image capture module 228. For example, rather than accessing digital storage location 265, electronic message module 232 may instead generate an email message, text message, or other message 247 and attach the captured image. Message module 232 may also insert, in the body of the message 247, predefined or customized text from the user requesting that the owner of the file send the digital version 246. In addition, the user may add extra information or a tag to help in the identification of the image, such as a date, keywords, names of people in the photo, etc. In some embodiments, the email address or phone number of the owner may be determined from the location identifier 240 or, alternatively, may be entered by the user of computing device 200.

Server computing device 250 may be any computing device with the capability of receiving a request for a file and transmitting the file to computing device 200. Thus, server computing device 250 may be, for example, a dedicated server or a personal computing device with file sharing capabilities. In the embodiment of FIG. 2, server computing device 250 includes processor 260, digital storage location 265, and file sharing module 270.

Processor 260 may be a CPU or microprocessor suitable for retrieval and execution of instructions and/or one or more electronic circuits configured to perform the functionality of one or more of the modules 270-279 described below. Digital storage location 265 may be a particular storage location in a local storage device accessible to server computing device 250. Thus, digital storage location 265 may be, for example, a drive, a partition, a folder, a path name of a file, or any location accessible to server computing device 250 in which one or more files are stored. As described in detail below, the local storage device of server computing device 250 may maintain information regarding a number of accounts 266, passwords 267 for accessing digital storage location 265, and files 268 stored in digital storage location 265.

Server computing device 250 may also include a series of modules 270-279 for transmitting a digital version 246 of a particular file. Each of the modules may include, for example, one or more hardware devices including electronic circuitry for implementing the functionality described below. In addition or as an alternative, each module may be implemented as a series of instructions encoded on a machine-readable storage medium of server computing device 250 and executable by processor 260.

File sharing module 270 may include a series of modules 271-279 for providing a user of computing device 200 with access to a digital version 246 corresponding to a printed version of a file. Thus, file sharing module 270 may include user account module 271, authentication module 273, file listing module 275, image searching module 277, and file transfer module 279.

In some embodiments, server computing device 250 may implement an online file hosting service that provides an account to the owner of the file 246. In such embodiments, user account module 271 may maintain a plurality of user accounts 266 and, for each account, provide a particular digital storage location 265 in which the account holder may store his or her digital files. In addition, authentication module 273 may maintain one or more passwords 267 or other authentication parameters for each account 266. For example, the owner of a particular account may enter a shared access password or authentication parameter using the account to permit access by third parties to the files maintained by the file hosting service for his or her account. This password may be used to allow access by a third party to a particular subset of files (e.g., a single folder or file) or, alternatively, to all files maintained by the file hosting service for the account owner. Authentication module 273 may require entry of the shared access password 267 by the user of computing device 200 and may only permit access to digital storage location 265 when a comparison of the entered password to the shared access password 267 indicates that the passwords match.

In other embodiments, server computing device 250 may directly share access to a digital storage location 265 accessible to server computing device 250. For example, digital storage location 265 may be a particular drive, partition, folder, or file available to server computing device 250 and server computing device 250 may share access to this location 265. In such embodiments, authentication module 273 may store a password 267 specified by the owner of the digital file to regulate access to digital storage location 265. Authentication module 273 may require entry of the shared access password 267 by the user of computing device 200 and may only permit access to digital storage location 265 when a comparison of the entered password and the shared access password 267 indicates that the passwords match.

File listing module 275 may, upon receipt of a proper password 243 or other authentication parameter, generate a listing 245 of files 268 available in the digital storage location 265 corresponding to the received location identifier 242. For example, when the digital storage location 265 is a drive, partition, or folder, file listing module 275 may generate a listing 245 of all folders and files 268 maintained in the particular location 265 and transmit this listing 245 to computing device 200. In embodiments in which digital version 246 is a digital photo, file listing 245 may include a reduced version of each digital file in digital storage location 265, such as a number of thumbnail images.

In some embodiments, image searching module 277 may also perform an image-based search. As detailed above, when the digital storage location 265 cannot be located or accessed, computing device 200 may transmit an image of printed version 244 along with a request that server computing device 250 attempt to locate the corresponding file in a local storage device. In response, image searching module 277 may access the local storage device and perform a search to attempt to locate the digital version 246 corresponding to the received image 244. In performing this search, image searching module 277 may, compare the received image 244 to each digital file available on the local storage device. For example, image searching module 277 may calculate a signature of the received image based on a number of properties of the image or set of images, such as the color and/or brightness, face recognition, or a template of images on the page. Image searching module 277 may then compare the calculated signature to a signature calculated for each digital version available in the local storage device to determine a signature value within a predetermined signature difference. If such a digital version is located, image searching module 277 may identify the matching version as the digital version 246 of the printed version of the file. In cases in which several possible choices are found, image searching module 277 may request the user to select the correct digital version 246 from a list of the closest results.

File transfer module 279 may receive a request for the digital version 246 of a particular file and, in response, transmit the file to the requesting computing device 200. Alternatively, when image searching module 277 successfully locates a digital version 246 corresponding to an image of the printed version 244, file transfer module 279 may transfer the digital version 246 to computing device 200. In some embodiments, file transfer module 279 may resize and/or compress digital version 246 prior to transmission to computing device 200 depending on the particular action to be taken by the user. For example, if digital version 246 is to be saved on computing device 200, file transfer module 279 may resize the image to a size convenient for viewing on most displays (e.g., 800 pixels×600 pixels) and perform some compression. As another example, if digital version 246 is to be printed by computing device 200, file transfer module 279 may resize the image depending on the desired printing size (e.g., 1600 pixels×1200 pixels for a 5" by 7" print) and perform minimal or no compression.

Figure 3:
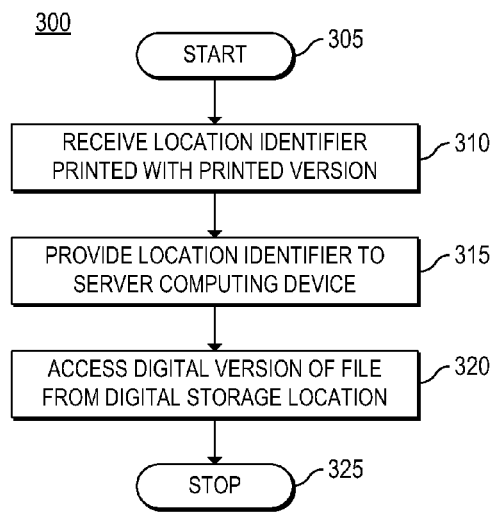
FIG. 3 is a flowchart of an example method for accessing a digital version of a file based on a location identifier printed in association with a printed version of the file.

FIG. 3 is a flowchart of an example method 300 for accessing a digital version of a file based on a location identifier printed in association with a printed version of the file. Although execution of method 300 is described below with reference to computing device 100, other suitable components for execution of method 300 will be apparent to those of skill in the art, such as computing device 200 of FIG. 2. Method 300 may be implemented in the form of executable instructions stored on a machine-readable storage medium, such as storage medium 120, and/or in the form of electronic circuitry.

Method 300 may start in block 305 and proceed to block 310, where computing device 100 may receive a location identifier printed in association with a printed version of a file. In some embodiments, a user may enter the location identifier using an input device of computing device 100. Alternatively, computing device 100 may utilize an available digital camera to capture an image of the location identifier and may subsequently extract the location identifier from the image.

After computing device 100 receives the location identifier, method 300 may proceed to block 315, where computing device 100 may provide the location identifier to a server computing device with access to the digital storage location corresponding to the location identifier. For example, upon receipt of the location identifier, computing device 100 may first identify a server computing device to which the location identifier is to be transmitted. Computing device 100 may then provide the location identifier to the identified server computing device.

Method 300 may then proceed to block 320, where computing device 100 may access the digital version of the file from the digital storage location. For example, upon establishing a connection with the server computing device, computing device 100 may provide a request for the digital version of the file corresponding to the printed version. In response, computing device 100 may receive the digital version of the file from the server. Method 300 may then proceed to block 325, where method 300 may stop.

FIGS. 4A-4D, described in turn below, are methods that collectively access a digital version of a file based on a location identifier printed in association with a printed version of a file. Although methods 400, 415, 435, 460 are described below with reference to computing device 200, other suitable components for execution of methods 400, 415, 435, 460 will be apparent to those of skill in the art. Methods 400, 415, 435, 460 may be implemented in the form of executable instructions stored on a machine-readable storage medium, such as storage medium 220, and/or in the form of electronic circuitry.

Figure 4A:
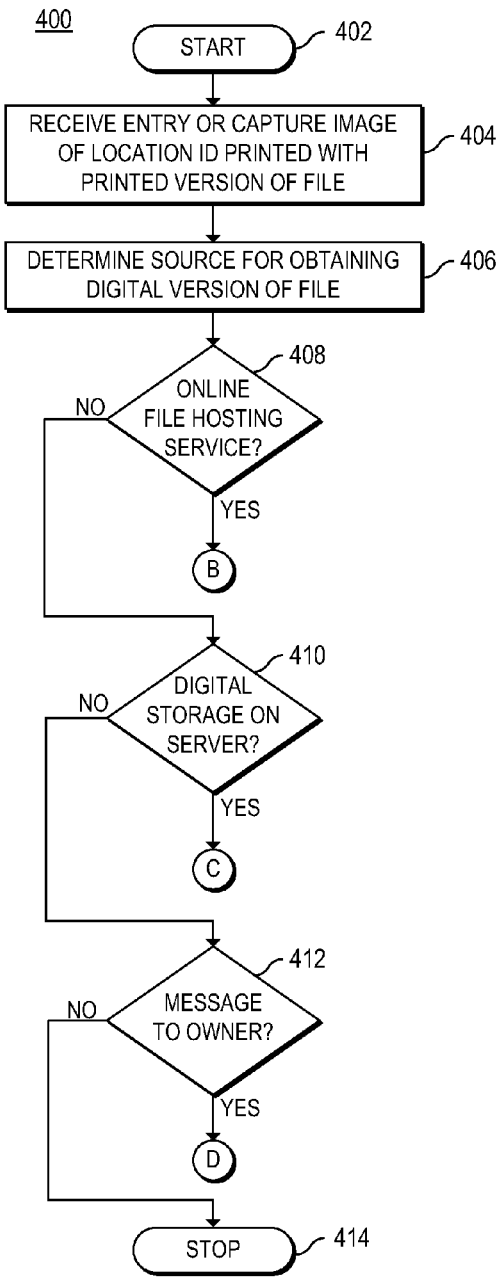
FIG. 4A is a flowchart of an example method for accessing a digital version of a file from one of three possible sources.

FIG. 4A is a flowchart of an example method 400 for accessing a digital version of a file from one of three possible sources. Method 400 may start in block 402 and proceed to block 404, where computing device 200 may capture an image of or otherwise receive entry of a location identifier printed in association with a printed version of a file.

After receipt of the location identifier by computing device 200, method 400 may proceed to block 406, where computing device 200 may determine the source for obtaining the digital version of the file. For example, computing device 200 may present a menu to the user requesting that the user specify whether the file is to be obtained from an online file hosting service, from digital storage on a server computing device 250, or by sending an electronic message to the owner of the file. Alternatively, in some embodiments, computing device 200 may automatically determine the source based on the location identifier received in block 404. For example, the location identifier may be encoded with information identifying the source, such as a URL, source name, or other identifier.

After determining the source, method 400 may proceed to block 408, where computing device 200 may determine whether the source is an online file hosting service. If so, method 400 may trigger execution of method 415 of FIG. 4B, described in detail below. Otherwise, method 400 may proceed to block 410, where computing device 200 may determine whether the source is digital storage on a server 250. If so, method 400 may trigger execution of method 435 of FIG. 4C, described in detail below. Otherwise, method 400 may proceed to block 412, where computing device 200 may determine whether an electronic message is to be sent to the owner of the file. If so, method 400 may trigger execution of method 460 of FIG. 4D, described in detail below. Otherwise, if computing device 200 is unable to determine the source of the file, method 400 may proceed to block 414, where method 400 may stop.

Figure 4B:
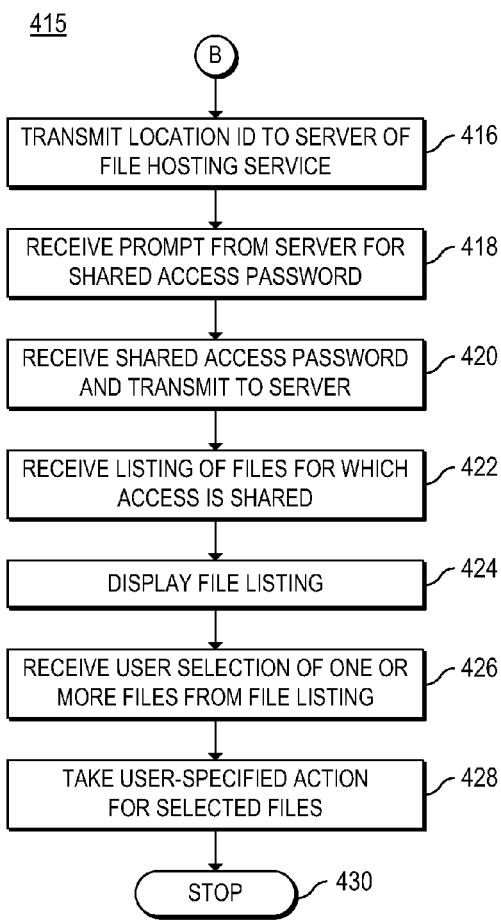
FIG. 4B is a flowchart of an example method for accessing a digital version of a file from an online file hosting service.

FIG. 4B is a flowchart of an example method 415 for accessing a digital version of a file from an online file hosting service, such as an online photo hosting service. Method 415 may start in block 416, where computing device 200 may transmit the location identifier determined in block 404 to the server computing device 250 of the file hosting service. As an example, the location identifier may be a URL including the base URL of the file hosting service and including a parameter specifying the particular digital storage location 265 to be accessed (e.g., a parameter specifying a user name or identifier of the owner of the file or the location of the owner's storage space). In such embodiments, computing device 200 may launch an application with web browsing capability and connect to the URL specified by the location identifier.

After computing device 200 transmits the location ID, method 415 may proceed to block 418, where computing device 200 may receive a prompt from the server computing device 250 for entry of a shared access password or other authentication parameter. This authentication parameter may be, for example, a parameter specified by the owner for a particular digital storage location 265 (e.g., a folder, photo album, or other group of files) or, alternatively, a parameter that allows for access to all of the owner's files. As with the location identifier, the authentication parameter may be printed in association with the printed version of the file. For example, the authentication parameter may be a group of characters included on the printed version, such as the title of the printed version. In response to receipt of the prompt, computing device 200 may output a request to the user for entry of the shared access password or other authentication parameter. Method 415 may then proceed to block 420, where computing device 200 may receive entry of the authentication parameter from the user and provide the authentication parameter to the server computing device 250.

Assuming that the entered authentication parameter is correct, method 400 may proceed to block 422, where computing device 200 may receive a listing of files for which access is shared by the owner of the account. For example, computing device 200 may receive a directory listing including folders and/or files that have been shared by the account owner. As another example, when the service is an online photo hosting service, computing device 200 may receive a listing of digital photos available on the digital storage location 265 as a plurality of thumbnail images. Regardless of the particular format, upon receipt of the file listing, method 415 may proceed to block 424, where computing device 200 may display the file listing.

Method 415 may then proceed to block 426, where computing device 200 may receive user selection of a particular file or files identified in the file listing. To continue with the previous examples, computing device 200 may receive selection of a file in a particular path or selection of a particular thumbnail image.

After computing device 200 receives user selection of a particular file, method 415 may proceed to block 428, where computing device 200 may take a user-specified action for the selected file or files. For example, computing device 200 may first retrieve a digital version of the file corresponding to the particular file or thumbnail selected by the user. Computing device 200 may then take an action specified by the user. For example, computing device 200 may save the digital version of the file to a local storage device and/or send the digital version to a printer accessible to computing device 200. In addition or as an alternative, computing device 200 may save the digital version of the file to an account of the user of computing device 200 maintained by the online file hosting service and/or order an additional printed version of the file from the online file hosting service. Finally, method 415 may proceed to block 430, where method 415 may stop.

Figure 4C:
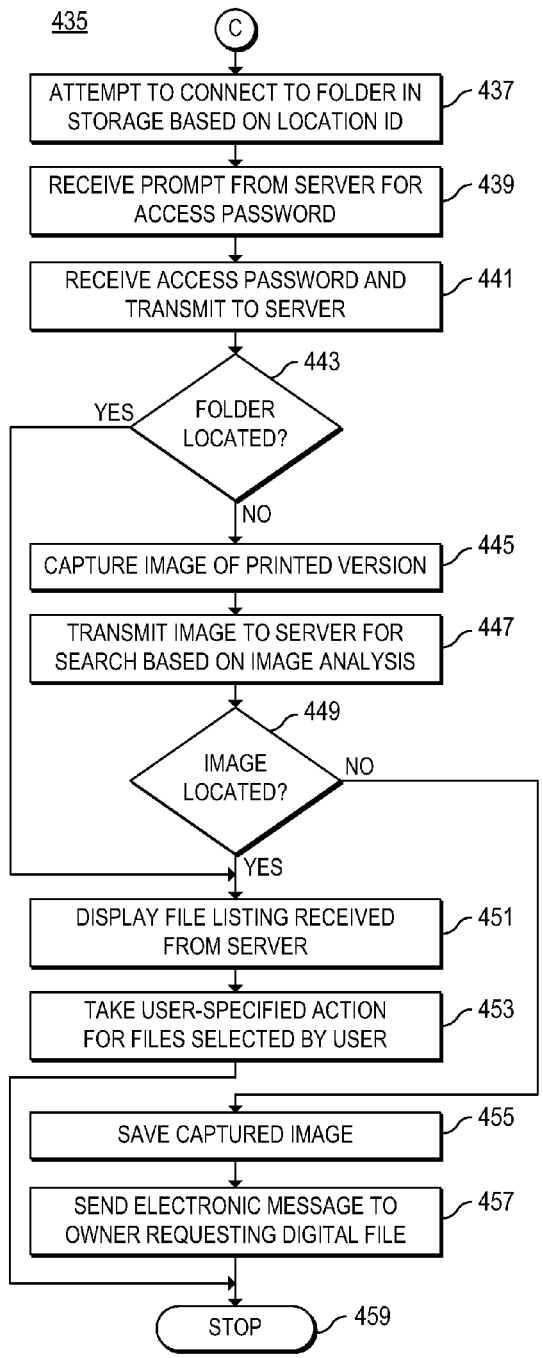
FIG. 4C is a flowchart of an example method for accessing a digital version of a file from a digital storage location accessible to a server computing device.

FIG. 4C is a flowchart of an example method 435 for accessing a digital version of a file from a digital storage location 265 accessible to a server computing device 250. Method 435 may start in block 437, where computing device 200 may attempt to connect to a specific folder in a local storage device accessible to server computing device 250. For example, the location identifier may specify a file path (e.g., "C:\My Documents\Photos") on a local storage device and computing device 200 may attempt to access the file path. If the file path is not located (e.g., if a folder was moved), then computing device 200 may be unable to locate the designated file path. In such situations, computing device 200 may then attempt to connect to a parent folder or path (e.g., "C:\My Documents" or "C:\").

Method 435 may then proceed to block 439, where computing device 200 may receive a prompt from server computing device 250 for entry of a password or other authentication parameter used to authorize access to the digital storage location 265. The authentication parameter may be, for example, a parameter specified by the owner for a particular file path, such that the owner may assign different access parameters for each of a number of file paths. Alternatively, the authentication parameter may be a single parameter that allows access to any folder shared by the owner. In response to receipt of the prompt, computing device 200 may output a request to the user for entry of the authentication parameter. Method 435 may then proceed to block 441, where computing device 200 may receive entry of the authentication parameter from the user and provide the authentication parameter to the server computing device 250.

Assuming that server computing device 250 permits access based on the entered authentication parameter, method 400 may proceed to block 443. In block 443, computing device 200 may determine whether the specified folder is available in the local storage device accessible to server computing device 250. If so, method 435 may proceed to block 451, described in detail below.

If, on the other hand, the specified folder is not available, computing device 200 may attempt to locate the digital version of the file using an image-based search of server computing device 250. Method 435 may therefore proceed to block 445, where computing device 200 may capture an image of the printed version using digital camera 212. For example, if the printed version is a document, computing device 200 may capture an image of an entire page of the document, such as the first page. As another example, if the printed version is a photo, computing device 200 may capture an image of the photo using digital camera 212. In some embodiments, computing device 200 may instead capture several images or pages in the printed version to allow server computing device 250 to more quickly narrow down the results.

After computing device 200 captures the image, method 435 may proceed to block 447, where computing device 200 may transmit the captured image to server computing device 250 along with a request that server computing device 250 perform an image-based search. It should be noted that, in some embodiments, prior to transmitting the captured image, computing device 200 may first reduce the size of the image by, for example, compressing and/or resizing the image. After receipt of the search request, server computing device 250 may execute an image-based search, such as the example search process described above in connection with image searching module 277 of FIG. 2. In the event that server computing device 250 locates several candidate digital versions, server computing device 250 may transmit a request to computing device 200, requesting that the user select the correct digital version from a list of possible results.

Method 435 may then proceed to block 449, where computing device 200 may determine whether server computing device 250 successfully located the digital version corresponding to the captured image. If so, method 435 may proceed to block 451, where computing device 200 may receive a file listing of the folder containing the located digital version or the folder specified by the location identifier if the folder was successfully located in block 443. Computing device 200 may then output the file listing to the user and await input of an action from the user.

Upon receipt of a user-specified action, method 435 may proceed to block 453, where computing device 200 may take the user-specified action for the file(s) selected by the user. For example, computing device 200 may first retrieve the digital version of the file(s) selected by the user from server computing device 250. Computing device 200 may then perform the user-specified action. For example, computing device 200 may save the digital version of the file to a local storage device and/or send the digital version to an available printer. Method 435 may then proceed to block 459, where method 435 may stop.

If, on the other hand, it is determined in block 449 that server computing device 250 was unable to locate the digital version corresponding to the captured image, method 435 may proceed to block 455. In block 455, computing device 200 may save the image captured in block 445 to a local storage device. Method 435 may then proceed to block 457, where computing device 200 may generate and send, to the owner of the file, an electronic message including the captured image and requesting that the owner transmit the digital version of the file. Method 435 may then proceed to block 459, where method 435 may stop.

Figure 4D:
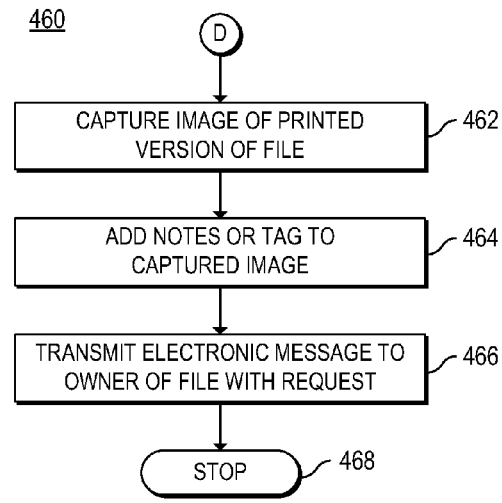
FIG. 4D is a flowchart of an example method for requesting a digital version of a file from an owner of the file.

FIG. 4D is a flowchart of an example method 460 for requesting a digital version of a file from an owner of the file. Method 460 may start in block 462, where computing device 200 may capture an image of the printed version of the file. For example, if the printed version is a document, computing device 200 may capture an image of an entire page of the document, such as the first page. As another example, if the printed version is a photo, computing device 200 may capture an image of the photo using digital camera 212.

Method 460 may then proceed to block 464, where computing device 200 may add notes or a tag to the captured image. For example, computing device 200 may provide an option for the user to enter a customized note to the owner of the file or add a user-specified tag containing a description of the printed version for which he or she desires a corresponding digital version.

Method 460 may then proceed to block 466, where computing device 200 may generate the electronic message including the captured image and any notes and/or tags. The electronic message may be, for example, an email or Short Message Service (SMS) text message. Computing device 200 may then transmit the electronic message to the owner of the file using an address included in the location identifier or entered by the user of computing device 200. The transmitted message may request that the owner of the file respond to the message with the digital version corresponding to the captured image. After transmission of the message, method 460 may proceed to block 468, where method 460 may stop.

Figure 5:
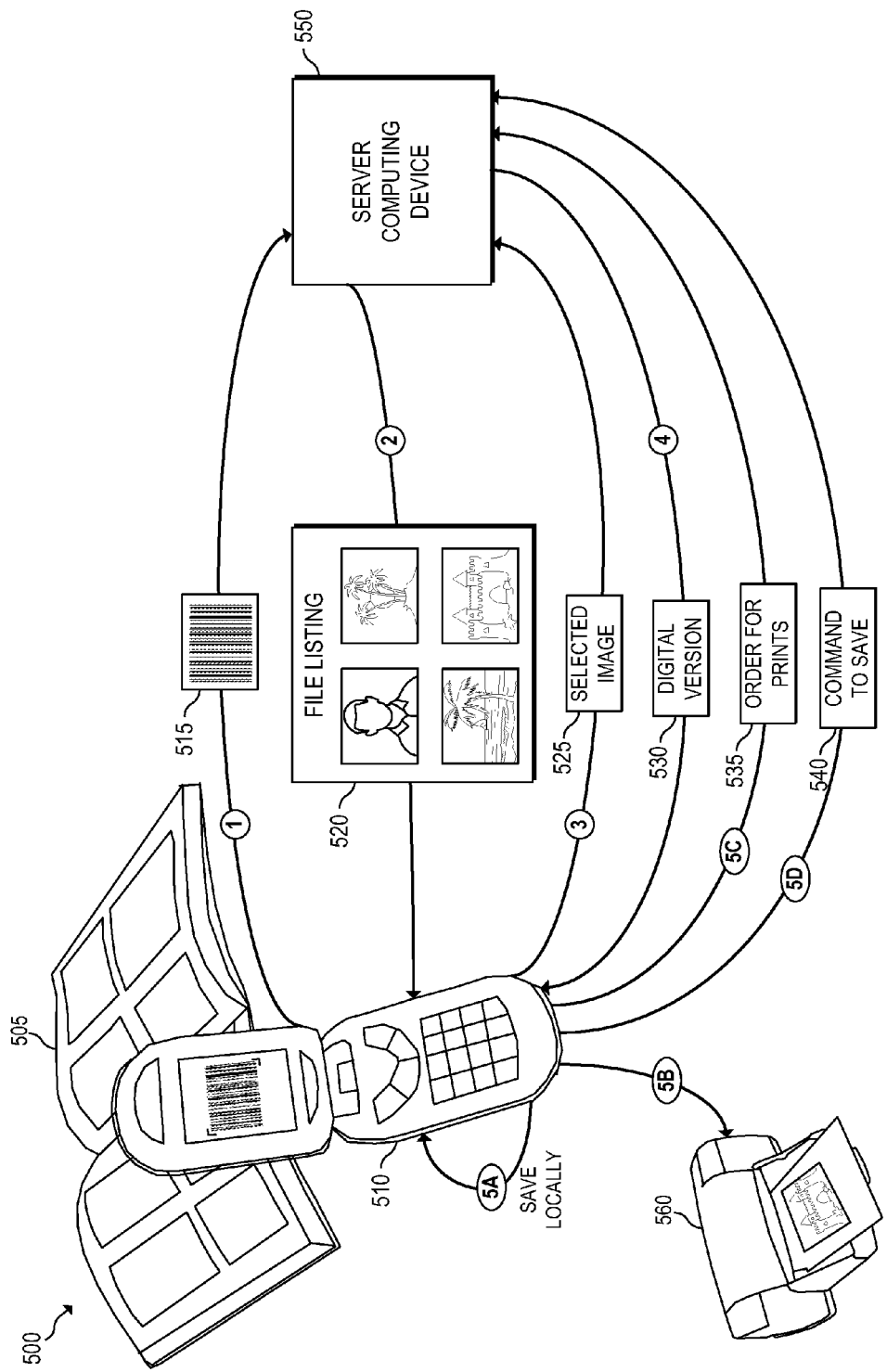
FIG. 5 is an example operation flow for obtaining a digital version of a photo based on a captured image of a location identifier printed in a photo album.

FIG. 5 is an example operation flow 500 for obtaining a digital version 530 of a photo based on a captured image 515 of a location identifier printed in a photo album 505. Although described below in connection with discovery of a digital image corresponding to a printed photo, operation flow 500 may be adapted for discovery of a digital version 530 corresponding to any type of printed file. Furthermore, although illustrated as a mobile phone, computing device 510 may be any type of computing device, such as a desktop computer, notebook computer, and the like.

As illustrated, the location identifier 515 is printed on a page of a photo album 505 that includes the printed version of a photo. It should be noted that the location identifier 515 may be printed in a number of other locations, such as the inside or outside of either cover of the photo album 505 or on the reverse side of each photo.

Operation flow 500 may start in sequence item 1, where a user may use a digital camera of computing device 510 to capture an image of location identifier 515, which, in this case, is a bar code. Computing device 510 may then decode the barcode to extract the location identifier or, as an alternative, transmit the captured image for decoding on server computing device 550.

In sequence item 2, server computing device 550 may receive the location identifier 515 and determine the digital storage location corresponding to the location identifier 515. In this case, the location identifier 515 corresponds to a folder in a storage device that includes a number of digital photos. Accordingly, server computing device 550 may generate a file listing 520 including a thumbnail for each digital photo and transmit the file listing 520 to computing device 510.

In sequence item 3, computing device 510 may receive a user selection of one of the thumbnails included in the file listing 520. Accordingly, computing device 510 may transmit a message identifying the selected image 525 to server computing device 550. In response, in sequence item 4, server computing device 550 may return the digital version 530 of the photo, which may be a high resolution version of the selected thumbnail image.

Upon receipt of the digital version 530, computing device 510 may provide a number of options to the user, each describing an action that the user can take on the received digital version 530. For example, as indicated by sequence item 5A, the user may save digital version 530 on a local storage device accessible to computing device 510. As indicated by sequence item 5B, the user may also instruct computing device 510 to print the image using an accessible printer 560.

Assuming that server computing device 550 is a server of an online photo hosting service, the user may have a number of additional options. For example, as indicated by sequence item 5C, the user may transmit an order for prints 535 of digital version 530. In addition, as indicated by sequence item 5D, the user may also instruct server computing device 550 to save the digital version 530 in association with his or her account maintained by the online photo hosting service.

According to the foregoing, example embodiments disclosed herein utilize a location identifier to provide a link between a printed and digital version of a file, such that the recipient of a printed version can easily access the digital version. In this manner, a recipient of a printed version of a file may enjoy the benefits of a hard copy, such as readability and mobility, while maintaining the ability to quickly and efficiently obtain a digital version if he or she desires.

We claim:

1. A computing device comprising:
   a processor to:
      receive a location identifier printed in association with a printed version of a file, wherein the location identifier uniquely identifies a digital storage location for which access rights are controlled by an owner of the file,
      provide the location identifier to a server computing device with access to the digital storage location,
      receive, from the server computing device, a listing of a plurality of files available on the digital storage location identified by the location identifier, wherein the listing of the plurality of files is generated based on the location identifier,
      display the listing of the plurality of files to a user of the computing device,
      receive, from the user, a selection of a particular file from the listing of the plurality of files, and
      in response to the user selection, access a digital version of the particular file from the digital storage location via the server computing device.

2. The computing device of claim 1, further comprising a digital camera, wherein, to receive the location identifier, the processor is configured to:
   capture an image of the location identifier using the digital camera, and
   extract the location identifier from the captured image.

3. The computing device of claim 1, wherein:
   the digital storage location is on a storage device accessible to the server computing device,
   the access rights for the digital storage location are controlled based on an access password assigned by the owner of the file, and
   the processor is to display the listing of the plurality of files upon provision of the access password to the server computing device.

4. The computing device of claim 3, wherein, when the digital storage location identified using the location identifier is not located, the processor is further configured to:
   capture an image of the printed version of the file using a digital camera accessible to the computing device, and
   provide the captured image to the server computing device for execution of a search of the storage device for a particular folder of a plurality of folders storing the digital version of the file based on comparison of the captured image to a plurality of digital files available in the plurality of folders.

5. The computing device of claim 4, wherein:
   when the search locates the digital version of the file, the processor is further configured to receive the listing of the plurality of files available on the digital storage location, and display the listing of the plurality of files to the user.

6. The computing device of claim 1, wherein the processor is to provide the location identifier to the server computing device without providing information unique to the file.

7. A machine-readable storage medium encoded with instructions executable by a processor of a computing device, the machine-readable storage medium comprising:
   instructions for receiving a location identifier that identifies a digital storage location, wherein the location identifier is printed in association with a printed version of a file;
   instructions for providing the location identifier to a server computing device with access to the digital storage location;
   instructions for receiving, from the server computing device, a listing of a plurality of files available on the digital storage location identified by the location identifier, wherein the listing of the plurality of files is generated based on the location identifier;
   instructions for displaying the listing of the plurality of files to a user of the computing device;
   instructions for receiving, from the user, a selection of a particular file from the listing of the plurality of files; and
   instructions for, in response to the user selection, accessing a digital version of the particular file from the digital storage location.

8. The machine-readable storage medium of claim 7, wherein the location identifier is one of a printed sequence of characters, a barcode, and an encoded image.

9. The machine-readable storage medium of claim 7, wherein the digital storage location is one of:
   a particular storage location in a storage device accessible to the server computing device for which access is controlled by an owner of the file; and
   a storage location provided for an account of the owner of the file by an online file hosting service implemented by the server computing device.

10. The machine-readable storage medium of claim 7, wherein the instructions for accessing the digital version of the file comprise at least one of:
    instructions for saving the digital version of the file to a local storage device of the computing device;
    instructions for sending the digital version of the file to a printer accessible to the computing device;
    instructions for saving the digital version of the file to an account of a user of the computing device maintained by an online file hosting service implemented by the server computing device; and
    instructions for ordering an additional printed version of the digital file from the online file hosting service.

11. The machine-readable storage medium of claim 7, further comprising:
    instructions for capturing an image of the printed version of the file using a digital camera of the computing device; and
    instructions for transmitting the captured image in an electronic message to the owner of the file requesting that the owner send the digital version of the file.

12. A method comprising:
    capturing, using a digital camera of a personal computing device, an image of a location identifier printed in association with a printed version of a photo, wherein the location identifier uniquely identifies a digital storage location;
    extracting the location identifier from the image of the location identifier;
    providing the location identifier to a server computing device with access to the digital storage location;
    receiving, from the server computing device, a listing of a plurality of digital photos available on the digital storage location identified by the location identifier, wherein the listing of the plurality of files is generated based on the location identifier;

displaying the listing of the plurality of digital photos to a user of the computing device;

receiving, from the user, a selection of a particular digital photo from the plurality of digital photos;

accessing the digital storage location based on the user selection of the particular digital photo; and receiving a digital version of the photo from the server computing device when the digital version of the photo is available in the digital storage location.

13. The method of claim 12, wherein accessing the digital storage location comprises:

providing the location identifier to the server computing device of an online photo hosting service;

receiving a request for an authentication parameter for accessing the digital storage location maintained by the online photo hosting service, wherein the authentication parameter is specified by an owner of the digital version using an account with the online photo hosting service; and providing the authentication parameter to the online photo hosting service upon receipt of the authentication parameter from a user.

14. The method of claim 12, wherein displaying the listing of the plurality of digital photos comprises displaying a plurality of thumbnail images corresponding to the plurality of digital photos.

15. The method of claim 12, further comprising, in response to receipt of the digital version of the photo, performing at least one of:

saving the digital version of the photo to a local storage device of the personal computing device;

sending the digital version of the photo to a printer accessible to the personal computing device;

saving the digital version of the photo to an account of a user of the computing device maintained by an online photo hosting service implemented by the server computing device; and ordering, from the online photo hosting service, an additional printed version of the photo.

16. The method of claim 12, further comprising:

sending an electronic message to an owner of the photo requesting the digital version when the digital version of the photo is not available in the digital storage location.

17. The method of claim 12, wherein the printed version of the photo does not include a unique identifier for the photo.

18. A server computing device, comprising:

a processor to:

receive, from a personal computing device, a location identifier printed in association with a printed version of a file, wherein the location identifier identifies a digital storage location on the server computing device, generate, based on the received location identifier, a listing of a plurality of files available on the digital storage location identified by the received location identifier, authenticate access of a user of the personal computing device to the digital storage location based on comparison of an entered authentication parameter provided by the user of the personal computing device to a shared authentication parameter specified by an owner of the file to control access to the digital storage location, and if the access of the user to the folder is authenticated, transmit, to the personal computing device, the listing of the plurality of files available on the digital storage location identified by the received location identifier.

19. The server computing device of claim 18, wherein:

the server computing device implements an online file hosting service, and the processor is further configured to receive entry of the shared authentication parameter from the owner of the file using an account provided by the online file hosting service.

20. The server computing device of claim 18, wherein the processor is further configured to:

receive a captured image of the printed version of the file, and perform a search to locate a particular folder of a plurality of folders storing a digital version of the file based on comparison of the captured image to a plurality of digital files available in the plurality of folders.

* * * * *